United States Patent [19]

Kawasumi et al.

[11] 4,330,600
[45] May 18, 1982

[54] MAGNETIC RECORDING MEDIUM

[75] Inventors: Kouichi Kawasumi; Haruo Watanabe; Junetsu Seto, all of Kanagawa, Japan

[73] Assignee: Sony Corporation, Tokyo, Japan

[21] Appl. No.: 195,005

[22] Filed: Oct. 8, 1980

[30] Foreign Application Priority Data

Oct. 13, 1979 [JP] Japan ................... 54-132196

[51] Int. Cl.³ .............................. H01F 10/10
[52] U.S. Cl. .................. 428/694; 428/697; 428/702; 428/900
[58] Field of Search .................. 427/127–132, 427/48; 428/900, 694, 697, 702

Primary Examiner—Bernard D. Pianalto
Attorney, Agent, or Firm—Hill, Van Santen, Steadman, Chiara & Simpson

[57] ABSTRACT

A magnetic recording medium is disclosed in which dispersion characteristics of magnetizable particles in a magnetic paint is improved which results in improved saturation magnetic flux density and squareness ratio. The dispersion characteristics is improved by the treatment of magnetizable particle with a titanium alcoholate compound having at least one group easy to be hydrolyzed and at least one oleophilic group hard to be hydrolyzed in an organic solvent.

5 Claims, No Drawings

4,330,600

MAGNETIC RECORDING MEDIUM

BACKGROUND OF THE INVENTION

1. Field of the Invention

The present invention relates to a magnetic recording medium having a nonmagnetic base and a magnetic layer formed thereon containing magnetizable particles dispersed in a resinous binder.

2. Description of the Prior Art

In general, a magnetic recording medium is manufactured by the manner that a magnetic paint or composition containing predominantly magnetizable particles (magnetic powder), resinous binder and solvent is coated on a nonmagnetic base, for example, a base film and then dried to form a magnetic layer. In this case, a good dispersion of the magnetizable particles in the magnetic paint or composition is desirable, for such good dispersion brings about high S/N ratio, high squareness ratio which is a ratio of the residual flux density Br to the saturation flux density Bm, and high packing of the magnetizable particles. For improvement of the dispersion, there are some well-known methods in which, for example, a dispersion agent is added to the magnetic paint or composition, or the surface of the magnetizable particle is modified into an oleophilic surface. Dispersion agents conventionally used are fatty acids having carbon atoms of 12 to 18, estus of such fatty acid with alcohol, metallic salts, amides, sulfates and phosphates of such fatty acid. Lecithin, higher alcohols, higher amines and so on also well-known as such dispersion agents. On the other hand, for the modification treatment of magnetizable particle into oleophilic surfaces, an alkylation, alkoxysilane treatment, alkylchromate treatment and so on of hydroxyl groups in the surface of the magnetizable particle are well-known. However, the above-mentioned conventional dispersion agents and modification treatments are not satisfactory.

OBJECTS AND SUMMARY OF THE INVENTION

It is an object of the present invention to provide an improved magnetic recording medium.

It is another object of the present invention to provide the magnetic recording medium in which a dispersion characteristics of magnetic powder are improved.

It is further object of the present invention to provide a magnetic recording medium having high packing density.

According to one aspect of the present invention there is provided a magnetic recording medium which comprises a non-magnetizable base and a magnetic layer formed thereon containing magnetizable particles and resinous binder, said magnetic layer including a titanium compound having at least one group easily hydrolyzed, and at least one oleophilic group difficult to hydrolyze.

DESCRIPTION OF THE PREFERRED EMBODIMENTS

The present invention is to improve the dispersion of magnetizable particles in a magnetic paint or composition. For this purpose, in a magnetic recording medium according to the present invention, magnetizable particles treated with a titanium compound (particularly, a titanium alcoholate compound) in which at least one group easily hydrolyzed and at least one oleophilic group difficult to hydrolyze are chemically bonded to a titanium atom, are dispersed in a resinous binder. Namely, in the magnetic recording medium according to the present invention, the surface of the magnetizable particles, particularly at least the surface of which has been oxidized, is modified into an oleophilic surface with the titanium compound to improve the dispersion of the magnetizable particles in the magnetic paint.

In a magnetic recording medium according to the invention, well-known magnetic particles may be used: for example, magnetic particles of oxides such as gamma-ferric oxide ($\gamma$-$Fe_2O_3$), magnetite ($Fe_3O_4$), an intermediate iron oxide between gamma-ferric oxide and magnetite, gamma-ferric oxide doped with cobalt atoms, magnetite doped with cobalt atoms, a Co-doped intermediate iron oxide between gamma-ferric oxide and magnetite, one of the above-mentioned Co-doped iron oxides further doped with one or more metallic elements (particularly, transition elements), one of the above-mentioned iron oxides with a coating containing predominantly oxide or hydroxide of cobalt, or chromium dioxide ($CrO_2$); magnetic particles of metal or alloy such as iron, cobalt, nickel, an alloy thereof, or an alloy containing one or more nonmetallic elements or metallic elements (particularly, transition elements). Usually, there is formed an oxide layer on the surface of such magnetic particles even on the surface of metal or alloy particles. Besides, under ordinary conditions, there is some adsorbed water on the surface oxide layer. The nearest part of the adsorbed water to the surface oxide layer stably bonds to the latter by being chemically adsorbed and dissociates into hydroxyl groups on the oxide layer to chemically combine with metallic ions of the particle. Therefore, the hydroxyl groups on the surface oxide layer are so stably bond to the metallic ions of the particle that they are not desorbed even by, for example, heating to 300° to 400° C. According to the invention, the above-mentioned hydroxyl groups existing on the surface of the magnetizable particle are reacted with the titanium compound (particularly, the titanium alcoholate compound) so as to modify the surface of the magnetizable particle into an oleophilic surface and stably bond oleophilic groups such as long-chained hydrocarbon groups to the surface of the magnetizable particle. As a result, the dispersion of the magnetizable particles is improved by a repulsion force between the oleophilic groups adsorbed on the surfaces of the particles. The reaction between a hydroxyl group on the surface of a magnetic particle and the titanium alcoholate compound according to the invention may be expressed as follows, wherein M and R represent a metallic atom and an aliphatic group respectively and each of X, Y and Z represents a group other than an alkoxy group in the titanium alcoholate compound:

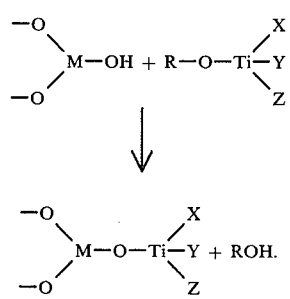

In the above equation, the alkoxy group (R-O-) of the titanium alcoholate compound can be hydrolyzed at room temperature even under neutral condition to be eliminated as alcohol (ROH) so that the titanium atom of the titanium alcoholate compound chemically and stably combines through an oxygen atom with the metallic atom M of the magnetizable particle. On the other hand, the other groups (-X, -Y, -Z) of the titanium alcoholate compound are difficult to under neutral condition and each of them is oleophilic containing, for example, a long-chained hydrocarbon group, so they still bond to the titanium atom after the reaction. As illustrated above, since the hydroxyl groups on the surface of the magnetizable particle are eliminated therefrom and oleophilic groups are instead introduced therein, the dispersion of the magnetizable particles in organic binder can be improved.

In a titanium alcoholate compound which can be used for the invention, a titanium atom having four valences may have one, two or three hydrolyzable groups (particularly, alkoxy group) bonded thereto. In this case, the above-mentioned two or three hydrolyzable groups may be made up of groups of one or more sorts. To the remaining valences or valence of the titanium atom, three, two or one group impossible or hard to be hydrolyzed (particularly, selected from acyl group, aryloxy group, thioaryloxy group, sulfonyl group, sulfinyl group, diester pyrophosphate group and diester phosphate group) is bonded. Also in this case, the above-mentioned three or two groups impossible or difficult to be hydrolyzed may be made up of groups of one or more sorts. Here, "impossible or hard to be hydrolyzed" means that the group is not hydrolyzed in a neutral aqueous solution at a temperature below 100° C.

As evident from the foregoing discussion and the following specific examples, the magnetic layer of the present invention includes a reaction product between a metallic hydroxide and a titanium compound having the grouping:

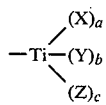

where Ti is a tetravalent titanium atom bonded to an alkoxy group, X, Y and Z are difficultly hydrolyzable oleophilic groups containing a hydrocarbon chain of from 1 to 50 carbon atoms, and a, b and c are integers of from 0 to 3, with a plus b plus c totalling from 1 to 3.

Among the above-mentioned groups impossible or hard to be hydrolyzed, is an acyl group which is expressed by

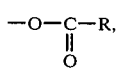

R is preferably a monovalent hydrocarbon group having carbon atoms of 1 to 50, more preferably 5 to 25. Particularly, the hydrocarbon group R may be an alkyl group, alkenyl group, aryl group, aralkyl group or alkalyl (alkylaryl) group. Besides, a part of the above-mentioned hydrocarbon group may be substituted by a halogen group, amino group, epoxy group, ether group, thioether group, ester group, cyano group, carbonyl group, nitro group or the like. Further, a constitutional carbon atom or atoms of the above-mentioned hydrocarbon group may be substituted by a different atom or atoms such as oxygen atoms, sulphur atoms or nitrogen atoms. The number of carbon atoms of the hydrocarbon group R should be at least one for the dispersion of magnetizable particles in resinous binder but when the number is above fifty, the magnetizable particles rather become difficult to be mixed with the resinous binder. In sulfonyl groups and sulfinyl group which are expressed by

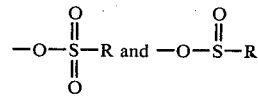

respectively, R is preferably a monovalent hydrocarbon groups similar to the above-mentioned one. In diester pyrophosphate groups and diester phosphate groups which are expressed by

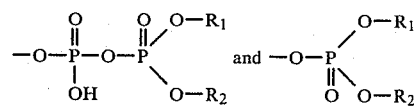

respectively, $R_1$ and $R_2$ are preferably the same or different monovalent hydrocarbon groups each having carbon atoms of 1 to 50, more preferably 5 to 25. Particularly, the hydrocarbon group $R_1$ or $R_2$ may be an alkyl group, alkenyl group, aryl group, aralkyl group or alkalyl group. Besides, a part of the above-mentioned hydrocarbon group may be substituted by a halogen group, amino group, epoxy group, ether group, thioether group, ester group, cyano group, carbonyl group, nitro group or the like. Further, a constitutional carbon atom or atoms of the above-mentioned hydrocarbon group may be substituted by a different atom or atoms such as oxygen atoms, sulphur atoms or nitrogen atoms. The number of carbon atoms of each of the hydrocarbon groups $R_1$ and $R_2$ is preferably 1 to 50 for the same reason as described above.

In aryloxy groups and thioaryloxy groups which have base structures expressed by

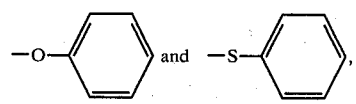

the number of carbon atoms of each thereof is preferably also 1 to 50. A part or parts of each base structure may be substituted by a substituent or substituents such as alkyl group, alkenyl group, aryl group, aralkyl group, alkalyl group, halogen group, amino group, epoxy group, ether group, thioether group, ester group, cyano group, carbonyl group or nitro group. Besides, a part of the above-mentioned substituent may be substituted by the other one of them. Further, a constitutional carbon atom or atoms of the above-mentioned hydrocarbon group may be substituted by a different atom or atoms such as oxygen atoms, sulphur atoms or nitrogen atoms.

On the other hand, in the above-mentioned hydrolyzable group, particularly, an alkoxy group expressed by -O-R, R is preferably a monovalent hydrocarbon group having carbon atoms of 1 to 15, more preferably an 1 to 5. Particularly, R is preferably alkyl group, alkenyl group or aralkyl group. In this case, a part of each of them may be substituted by a halogen group, amino group, epoxy group, ether group, thioether group, ester group, cyano group, carbonyl group, nitro group or the like. Further, a constitutional carbon atom or atoms of the above-mentioned hydrocarbon group may be substituted by a different atom or atoms such as oxygen atoms, sulphur atoms or nitrogen atoms. When the number of carbon atoms of the alkoxy group R is above fifteen, it becomes difficult to separate the residual of the composition reaction as described hereinafter. This number of carbon atoms is more preferably 1 to 5 for such separation operation, composition reaction and the factor of cost.

In the above-mentioned titanium alcoholate compound which can be used for the invention, at least one hydrolyzable group and at least one group hydrolyzed with difficulty are bonded to a titanium atom. In this case, when plural hydrolyzable groups are bonded to the titanium atom, they may construct a chelate structure and further, two of them may be bonded to each other. Besides, titanium alcoholate compound used for the invention may be a chelate compound in which a hydrolyzable group and a group hydrolyzed with difficulty are bonded to each other, or two of plural groups difficultly to be hydrolyzed are bonded to each other. Examples of such titanium alcoholate compounds are as follows:

| | |
|---|---|
| isopropyltristearoyl titanate; | 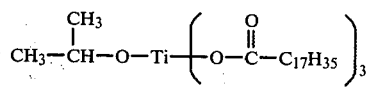 |
| isopropyltrioctanoyl titanate; | 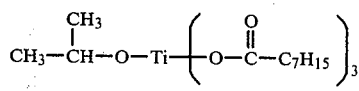 |
| isopropyldi(stearoyl) cumylphenyl titanate; | 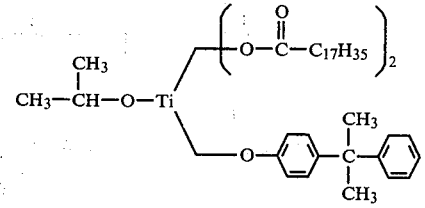 |
| isopropyldi(stearoyl) methacryl titanate; | 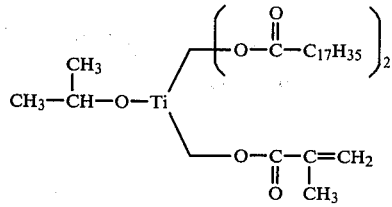 |
| isopropyldi(methacryl) stearoyl titanate; | 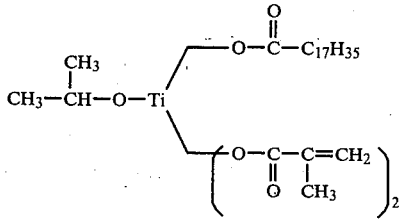 |
| isopropyltri(dodecylbenzenesulfonyl) titanate; | 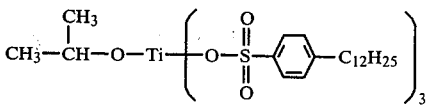 |
| isopropyldi(isostearoyl) acryl titanate; | 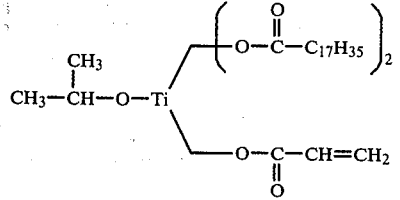 |

-continued isopropylstearoyldiacryl titanate; 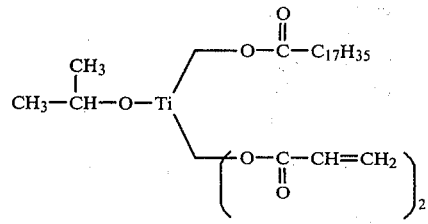

isopropyltri(dioctylphosphate) titanate; 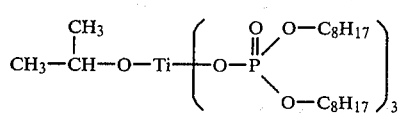

isopropyl-4-aminobenzene sulfonyldi(dodecylbenzenesulfonyl) titanate; 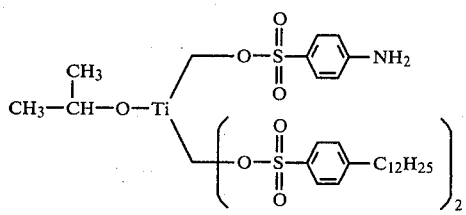

isopropyltrimethacryl titanate; 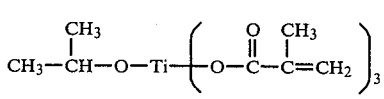

isopropyltricumylphenyl titanate; 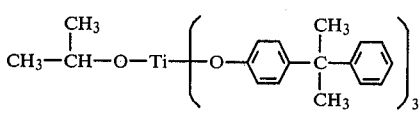

isopropyldi(4-aminobenzoyl) stearoyl titanate; 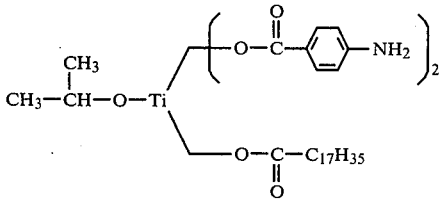

isopropyltri(dioctylpyrophosphate (titanate; 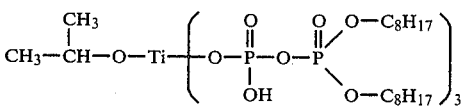

isopropyltriacryl titanate; 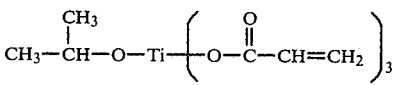

isopropyltrianthranyl titanate; 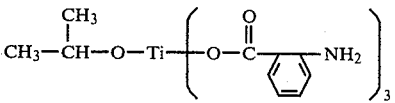

isopropyloctylbutylpyrophosphate titanate; 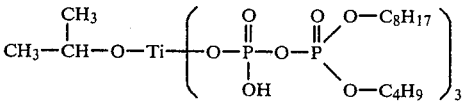

isopropyldi(butylmethylpyrophosphate) titanate; 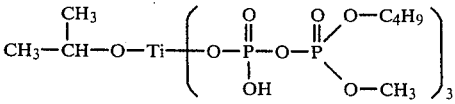

| | |
|---|---|
| di(methacryl)ethylene titanate; | 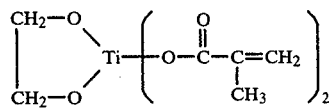 |
| 4-aminobenzenesulfonyl-stearoylethylene titanate; | 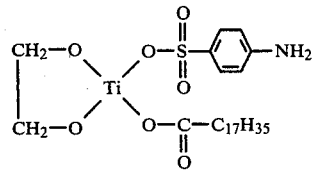 |
| di(dioctylpyrophosphate) ethylene titanate; | 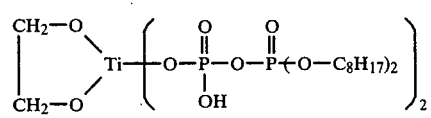 |
| di(acryl)ethylene titanate; | 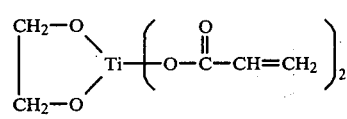 |
| di(anthranyl)ethylene titanate; | 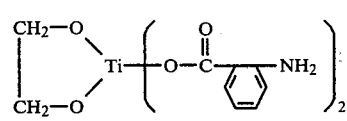 |
| di(butylmethylpyrophosphate)ethylene titanate; | 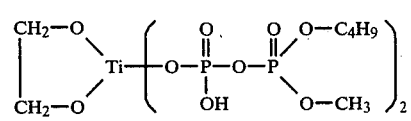 |
| di(isostearoyl)ethylene titanate; | 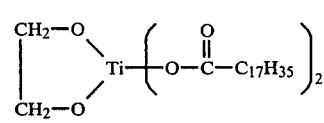 |
| stearoylmethacrylethylene titanate; | 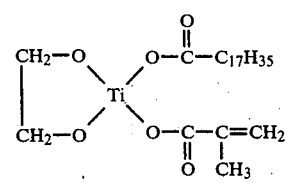 |
| di(dioctylphosphate) ethylene titanate; | 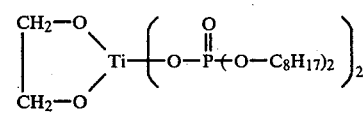 |
| 4-aminobenzenesulfonyl (dodecylbenzenesulfonyl) ethylene titanate; | 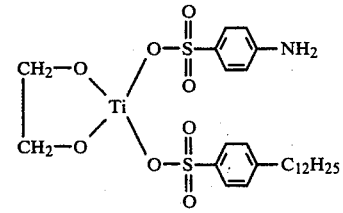 |
| di(stearoyl)oxyacetate titanate; | 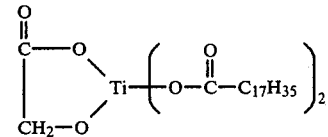 |

-continued stearoylmethacryloxy-
acetate titanate;

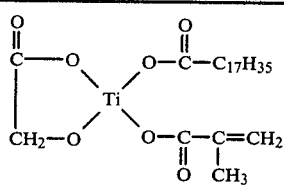

stearoylacryloxyacetate
titanate;

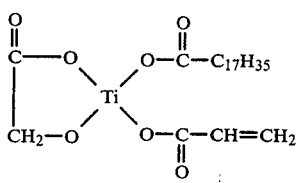

di(dioctylphosphate)ox-
yacetate titanate;

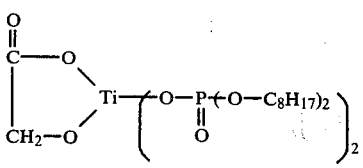

4-aminobenzenesulfonyl
(dodecylbenzenesulfonyl)
oxyacetate titanate;

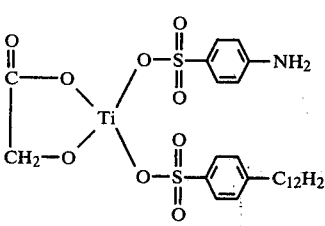

di(methacryl)oxyacetate
titanate;

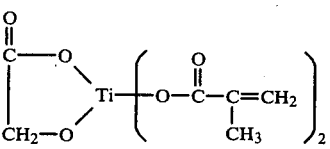

di(2,2-dimethyl-2-phenyle-
thylcumylphenyl)oxyacetate
titanate;

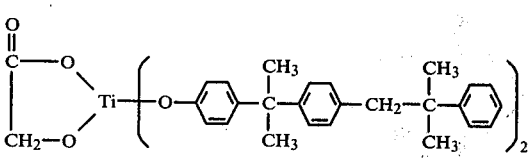

4-aminobenzoylstearoyl-
oxyacetate titanate;

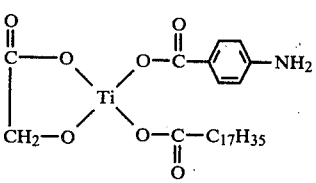

di(dioctylpyrophosphate)
oxyacetate titanate;

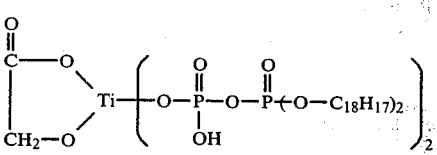

di(acryl)oxyacetate
titanate;

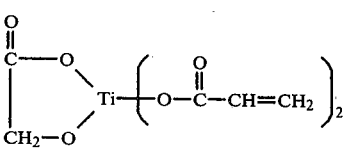

| | |
|---|---|
| di(octylbutylpyrophosphate)oxyacetate titanate; | 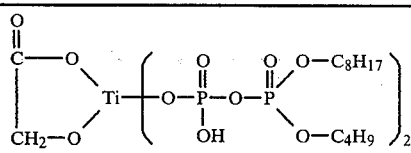 |

Such titanium alcoholate compound can be made, for example, by the following manner. To make a titanium alcoholate compound expressed by $(R_1O)_{4-n}$Ti—$(OOCR_2)_n$, at first, a compound expressed by Ti—$(OR_1)_4$ is formed by a reaction expressed by the following equation:

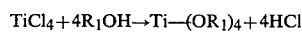

Since such compound Ti—$(OR_1)_4$ is commercially available, it may be used directly for the following process. Next, a fatty acid expressed by $R_2$-COOH is reacted with the compound Ti—$(OR_1)_4$ under low pressure and high temperature conditions to obtain a titanium alcoholate compound. This reaction is expressed by the following equation:

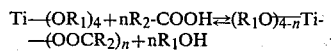

According to the invention, the surface of magnetizable particle is treated with the above-mentioned titanium alcoholate compound. Further, for a magnetic recording medium according to the invention, the other pigment or pigments, for example, antistatic an agent or abrasive, each having an active hydrogen group or groups on the surface thereof, are suitably added to constitute a magnetic recording layer (magnetic layer). In this case, it is effective for the dispersion of such pigment or pigments to treat the surface thereof with the titanium alcoholate compound.

According to the invention, the above-mentioned surface treatment of magnetizable particles with a titanium alcoholate compound can be performed by the following manner. Generally, a titanium alcoholate compound is dissolved in a solvent which contains magnetizable particles and the other pigment or pigments but no resinous binder so as to treat the surface of the magnetizable particles, and then a resinous binder is added thereto in order to form a magnetic paint. Or as a preferable manner, magnetizable particles, the other pigment or pigments and a titanium alcoholate compound are, for example, directly stirred to mix uniformly with one another before the mixture is dispersed in a resinous binder and a solvent. Or as a more preferable manner, after the surface treatment of magnetizable particles and the other pigment or pigments with a titanium alcoholate compound, the mixture is washed for removing eliminated alcohol at the reaction and the residual titanium alcoholate compound which is not adsorbed on the surface of particles, and then the washed mixture is dispersed in a resinous binder and a solvent. However, the dispersion can be sufficiently improved even by a method similar to methods used with a conventional dispersion agent, for example, a titanium alcoholate compound is mixed at the same time that magnetizable particles, the other pigment or pigments, a resinous binder, a solvent and the other component or components are mixed with one another, or the titanium alcoholate compound is added in the midst of the mixing operation of the above-mentioned mixture components. According to the invention, the amount of titanium alcoholate compound to be used is preferably 0.5 to 20 weight parts, more preferably 1.0 to 15 weight parts for 100 weight parts of magnetizable particles.

For the other materials and manufacturing process in a magnetic recording medium according to the invention, well-known materials and process which have been employed for a conventional magnetic recording medium, may be used. Examples of a resinous binders which can be used for the invention are a copolymer of vinyl chloride and vinyl acetate, a copolymer of vinyl chloride, vinyl acetate and vinyl alcohol, a copolymer of vinyl chloride, vinyl acetate and maleic acid, a copolymer of vinyl chloride and vinylidene chloride, a copolymer of vinyl chloride and acrylonitrile, a copolymer of acrylic acid ester and acrylonitrile, a copolymer of acrylic acid ester and vinylidene chloride, a copolymer of methacrylic acid ester and vinylidene chloride, a copolymer of methacrylic acid ester and styrene, a thermoplastic polyurethane resin, a phenoxy resin, polyvinyl fluoride, a copolymer of vinylidene chloride and acrylonitrile, a copolymer of butadiene and acrylonitrile, a copolymer of acrylonitrile, butadiene and acrylic acid, a copolymer of acrylonitrile, butadiene and methacrylic acid, polyvinyl butyral, polyvinyl acetal, a cellulose derivative, a copolymer of styrene and butadiene, a polyester resin, a phenol resin, an epoxy resin, a thermosetting polyurethane resin, an urea resin, a melamine resin, an alkyd resin, an ureaformaldehyde resin and so on, or these in mixture. Examples of a solvent which can be used for making a magnetic paint are ketones such as acetone, methyl ethyl ketone, methyl isobutyl ketone or cyclohexanone; esters such as methyl acetate, ethyl acetate, butyl acetate or ethyl lactate; glycol ethers such as ethylene glycol dimethyl ether, ethylene glycol monoethyl ether or dioxane; aromatic hydrocarbons such as benzene, toluene or xylene; and aliphatic hydrocarbons such as hexane or heptane; or these in mixtures. Further, in a magnetic recording medium according to the invention, aluminum oxide, chromium oxide, silicon oxide or the like can be used as abrasive, carbon black or the like as antistatic agent, and molybdenum disulfide, graphite, silicone oil or the like as lubricant. Furthermore, in a magnetic recording medium according to the invention, though the dispersion of magnetic particles is sufficiently improved by a titanium alcolate compound, the latter may be used together with the other dispersing agent or agents such as lecithin. On the other hand, the base such as base film to be coated with the above-mentioned magnetic paint is made of a nonmagnetic substance, for example, a polyester such as polyethylene terephthalate, a polyolefine such as polypropylene, a cellulose derivative such as cellulose triacetate or cellulose diacetate, a polycarbonate, a polyvinyl chloride, a polyimide, a nonmagnetic metal such as aluminum or copper, paper or the like.

The following specific examples are submitted to illustrate the invention.

EXAMPLES

The following composition was prepared:

| | |
|---|---|
| acicular ferromagnetic powder of gamma ferric oxide ($\gamma$-$Fe_2O_3$)[1] | 100 weight parts |
| titanium alcoholate compound of isopropyltri (dodecylbenzenesulfonyl) titanate | 5 weight parts |
| toluene (solvent) | 80 weight parts |

[1]*particle size: length = 0.2 to 0.4$\mu$
*acicular ratio (major axis length/minor axis length) = 8 to 10
*saturation magnetization $\sigma_2$ = 73.0 emu/g
*specific surface area = 23.8 $m^2$/g The above composition was mixed in a ball mill for fifteen hours and then after a resinous binder solution was added thereto, the obtained mixture was further mixed for twenty four hours to form a magnetic paint. The resinous binder solution had the following composition:

| | |
|---|---|
| copolymer of vinyl chloride and vinyl acetate[2] | 17 weight parts |
| cyclohexanone (solvent) | 120 weight parts |

[2]*a commercially available binder under the trade name "Vinylite VYHH" from Union Carbide Corp.
*the weight ratio of vinyl chloride to vinyl acetate = 87:13

The obtained magnetic paint was coated on a polyester film having a thickness of 20$\mu$ in order to form a magnetic layer having a dry thickness of 6$\mu$, and then after an orientation treatment in a magnetic field, the paint was dried at an elevated temperature to obtain a magnetic tape. The magnetic characteristics of the obtained magnetic tape were measured. The saturation magnetic flux density Bm was 1600 gauss (without calender treatment, the same hereinafter), the ratio $R_s$ of the residual magnetic flux density Br to the saturation flux density Bm was 0.84, and the coercive force Hc was 366 Oe. These results are all good.

The above-mentioned magnetic characteristics were measured as to similar magnetic tapes but the kind and amount of titanium alcoholate compound were varied. The results are shown in the table below.

Comparative Example

In this comparative example, a magnetic tape was prepared by a similar manner in the above-mentioned examples but crude soybeen lecithin of 5 weight parts was used instead of the titanium alcoholate compound according to the invention. In the resulting characteristics, the saturation magnetic flux density Bm was 1210 gauss, the ratio $R_s$ of the residual magnetic flux density Br to the saturation magnetic flux density Bm was 0.81, and the coercive force Hc was 352 Oe.

These results of the above-mentioned examples and comparative example are shown in the below table. From the table, it is clear that the saturation magnetic flux density Bm and the ratio $R_s$ of the residual flux density Br to the saturation flux density Bm are improved according to the invention.

TABLE

| | surface treatment agent | amount (PHP) | Bm (gauss) | $R_s$ | Hc (Oe) |
|---|---|---|---|---|---|
| Examples | isopropyltristearoyl titanate | 0.5 | 1120 | 0.80 | 378 |
| | | 1.0 | 1260 | 0.82 | 381 |
| | | 2.0 | 1400 | 0.83 | 369 |
| | | 5.0 | 1470 | 0.83 | 370 |
| | di(dioctylphosphate) oxyacetate titanate | 2.0 | 1430 | 0.83 | 369 |
| | | 5.0 | 1570 | 0.85 | 372 |
| | | 10.0 | 1450 | 0.85 | 370 |
| | isopropyltri(dioctylpyrophosphate) titanate | 5.0 | 1670 | 0.83 | 365 |
| | isopropyltri(dodecylbenzenesulfonyl)titanate | 5.0 | 1600 | 0.84 | 366 |
| | isoprophytri(dioctylphosphate) titanate | 5.0 | 1370 | 0.82 | 370 |
| | di(dioctylphosphate)ethylene titanate | 5.0 | 1340 | 0.85 | 370 |
| C.E.* | crude soybeen lecithin | 5.0 | 1210 | 0.81 | 352 |

*Comparative Example

We claim as our invention:

1. A magnetic recording medium comprising a non-magnetizable base, and a magnetic layer formed thereon containing magnetizable particles and a resinous binder, said magnetic layer including a reaction product between a metallic hydroxide and a titanium compound having the grouping:

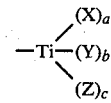

where Ti is tetravalent titanium atom bonded to an alkoxy group, X, Y and Z are difficultly hydrolyzable oleophilic groups containing a hydrocarbon chain of from 1 to 50 carbon atoms, and a, b and c are integers of from 0 to 3, with a plus b plus c totalling from 1 to 3.

2. A magnetic recording medium according to claim 1 in which said titanium compound is present in said magnetic layer in an amount of from 0.5 to 20 parts by weight per 100 parts by weight of said magnetizable particles.

3. A magnetic recording medium according to claim 1 wherein said titanium compound is present in said magnetic layer in an amount of from 1.0 to 15 parts by weight per 100 parts by weight of said magnetizable particles.

4. A magnetic recording medium according to claim 1 in which said alkoxy group contains from 1 to 15 carbon atoms.

5. A magnetic recording medium according to claim 1 in which said oleophilic group is selected from the group consisting of acyl groups, aryloxy groups, thioaryloxy groups, sulfonyl groups, sulfinyl groups, diester pyrophosphate groups, and diester phosphate groups.

* * * * *